(12) United States Patent
Srinivasan et al.

(10) Patent No.: US 11,164,395 B2
(45) Date of Patent: Nov. 2, 2021

(54) STRUCTURE SWITCHING IN A THREE-DIMENSIONAL ENVIRONMENT

(71) Applicant: Microsoft Technology Licensing, LLC, Redmond, WA (US)

(72) Inventors: Vidya Srinivasan, Issaquah, WA (US); Andrew John Howe, Sammamish, WA (US); Michael Lee Smith, Kirkland, WA (US); Harold Anthony Martinez Molina, Seattle, WA (US); Nathan Bradley Duke, Kirkland, WA (US); Amy Scarfone, Seattle, WA (US); Purnima Rao, Bellevue, WA (US); Colton Brett Marshall, Redmond, WA (US); Aniket Handa, Seattle, WA (US); Spencer J. Kopach, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/413,542

(22) Filed: May 15, 2019

(65) Prior Publication Data
US 2020/0364943 A1 Nov. 19, 2020

(51) Int. Cl.
*G06T 15/00* (2011.01)
*G06T 19/20* (2011.01)
(Continued)

(52) U.S. Cl.
CPC .......... *G06T 19/20* (2013.01); *G06F 3/04815* (2013.01); *G06T 7/75* (2017.01); *G06T 15/20* (2013.01); *G06T 19/003* (2013.01)

(58) Field of Classification Search
CPC ........ G06T 19/00; G06T 17/20; G06T 17/00; G06T 15/10; G06T 15/00
(Continued)

(56) References Cited

U.S. PATENT DOCUMENTS 10,181,218 B1    1/2019   Goetzinger et al.
10,339,721 B1    7/2019   Dascola et al.
(Continued)

FOREIGN PATENT DOCUMENTS

EP    2469474 A1    6/2012
WO    2019046597 A1    3/2019

OTHER PUBLICATIONS

"SharePoint Spaces", Retrieved From: https://web.archive.org/web/20190401134501/https://www.exploresharepointspaces.com/, Apr. 1, 2019, 9 Pages.
(Continued)

*Primary Examiner* — Gordon G Liu
(74) *Attorney, Agent, or Firm* — Newport IP, LLC; Jacob P. Rohwer

(57) ABSTRACT

Aspects of the present disclosure relate to structure switching in a 3D environment. In examples, an authoring application is used to select characteristics for the 3D environment and to insert content. For example, a structure is selected in which to present the content in the 3D environment. An asset container comprises assets associated with the selected structure, which are included in the 3D environment. In some examples, a common asset container comprises other assets that are included in the 3D environment. End users are able to view the 3D environment using a viewer application. If the author decides to change the selected structure, an asset container associated with the new structure is identified. Assets for the old structure are removed from the 3D environment and assets for the new structure are included instead. Thus, a set of asset containers is used generate the 3D environment and change characteristics therein.

14 Claims, 11 Drawing Sheets

(51) Int. Cl.
   *G06T 7/73* (2017.01)
   *G06F 3/0481* (2013.01)
   *G06T 15/20* (2011.01)
   *G06T 19/00* (2011.01)
(58) Field of Classification Search
   USPC .......................................................... 345/419
   See application file for complete search history.

(56) References Cited

U.S. PATENT DOCUMENTS

| | | |
|---|---|---|
| 2001/0044858 A1 | 11/2001 | Rekimoto |
| 2002/0018061 A1 | 2/2002 | Gantt |
| 2007/0120846 A1 | 5/2007 | Ok et al. |
| 2009/0055735 A1* | 2/2009 | Zaleski ............... G16H 40/63 715/700 |
| 2010/0095248 A1* | 4/2010 | Karstens ............ G06F 3/04817 715/846 |
| 2010/0321391 A1 | 12/2010 | Beckman et al. |
| 2011/0279445 A1 | 11/2011 | Murphy et al. |
| 2012/0075343 A1 | 3/2012 | Chen et al. |
| 2012/0229449 A1* | 9/2012 | Psistakis ............... G11B 27/11 345/419 |
| 2013/0090101 A1 | 4/2013 | Park et al. |
| 2013/0187912 A1 | 7/2013 | Mueller |
| 2013/0235234 A1 | 9/2013 | Cucci et al. |
| 2013/0328871 A1 | 12/2013 | Piemonte et al. |
| 2013/0328925 A1 | 12/2013 | Latta et al. |
| 2013/0335405 A1 | 12/2013 | Scavezze et al. |
| 2014/0058959 A1 | 2/2014 | Isbjornssund et al. |
| 2014/0143691 A1 | 5/2014 | Huang |
| 2014/0176542 A1 | 6/2014 | Shohara et al. |
| 2014/0267279 A1 | 9/2014 | Kontkanen |
| 2014/0285619 A1 | 9/2014 | Acquavella et al. |
| 2015/0049086 A1 | 2/2015 | Morato et al. |
| 2015/0052479 A1 | 2/2015 | Ooi et al. |
| 2015/0091906 A1* | 4/2015 | Dishno ................ G06F 16/954 345/427 |
| 2015/0249815 A1 | 9/2015 | Sandrew et al. |
| 2015/0254905 A1 | 9/2015 | Ramsby et al. |
| 2015/0309705 A1 | 10/2015 | Keeler et al. |
| 2015/0350634 A1 | 12/2015 | Lim et al. |
| 2015/0358613 A1 | 12/2015 | Sandrew et al. |
| 2016/0019720 A1 | 1/2016 | Thurber et al. |
| 2016/0078679 A1 | 3/2016 | Maximo |
| 2016/0210788 A1 | 7/2016 | Kasahara |
| 2016/0275209 A1 | 9/2016 | Kelly et al. |
| 2016/0358374 A1 | 12/2016 | Ju et al. |
| 2017/0069143 A1 | 3/2017 | Salter et al. |
| 2017/0076429 A1 | 3/2017 | Russell |
| 2017/0169616 A1 | 6/2017 | Wiley et al. |
| 2017/0372457 A1 | 12/2017 | Sylvan et al. |
| 2018/0113596 A1 | 4/2018 | Ptak et al. |
| 2018/0190003 A1 | 7/2018 | Upadhyay et al. |
| 2018/0268582 A1 | 9/2018 | Schneider et al. |
| 2018/0286139 A1 | 10/2018 | Moncayo |
| 2018/0308274 A1 | 10/2018 | Molina et al. |
| 2018/0308289 A1 | 10/2018 | Srinivasan et al. |
| 2018/0314405 A1 | 11/2018 | Le Doux et al. |
| 2019/0065027 A1 | 2/2019 | Hauenstein et al. |
| 2019/0111347 A1 | 4/2019 | Rimon |
| 2019/0246238 A1 | 8/2019 | Crutchfield et al. |
| 2019/0251076 A1* | 8/2019 | Yan .................... G06Q 40/04 |
| 2019/0340829 A1 | 11/2019 | Marshall et al. |
| 2019/0385371 A1 | 12/2019 | Joyce et al. |
| 2020/0082627 A1 | 3/2020 | Palos et al. |
| 2020/0111195 A1 | 4/2020 | Vlachos et al. |
| 2020/0363929 A1 | 11/2020 | Srinivasan et al. |
| 2020/0363930 A1 | 11/2020 | Srinivasan et al. |
| 2020/0364941 A1 | 11/2020 | Srinivasan et al. |
| 2020/0364942 A1 | 11/2020 | Srinivasan et al. |
| 2020/0366832 A1 | 11/2020 | Srinivasan et al. |

OTHER PUBLICATIONS

"International Search Report and Written Opinion issued in PCT Application No. PCT/US20/028025", dated Sep. 3, 2020, 17 Pages.
"International Search Report and Written Opinion issued in PCT Application No. PCT/US20/028380", dated Sep. 7, 2020, 19 Pages.
"Non Final Office Action Issued in U.S. Appl. No. 16/413,528", dated Aug. 18, 2020, 19 Pages.
"International Search Report and Written Opinion Issued in PCT Application No. PCT/US20/028382", dated Jul. 16, 2020, 11 Pages.
"International Search Report and Written Opinion Issued in PCT Application No. PCT/US20/028384", dated Jul. 30, 2020, 11 Pages.
"International Search Report and Written Opinion Issued in PCT Application No. PCT/US20/028026", dated Jul. 14, 2020, 11 Pages.
"Non Final Office Action Issued in U.S. Appl. No. 16/413,519", dated Jul. 29, 2020, 11 Pages.
"Non Final Office Action Issued in U.S. Appl. No. 16/413,485", dated Jun. 29, 2020, 28 Pages.
"Notice of Allowance Issued in U.S. Appl. No. 16/413,478", dated Jul. 16, 2020, 9 Pages.
"Notice of Allowance Issued in U.S. Appl. No. 16/413,455", dated Nov. 27, 2020, 11 Pages.
"International Search Report and Written Opinion Issued in PCT Application No. PCT/US20/028378", dated Jul. 24, 2020, 9 Pages.
"Final Office Action Issued in U.S. Appl. No. 16/413,519", dated Dec. 9, 2020, 13 Pages.
"Notice of Allowance Issued in U.S. Appl. No. 16/413,478", dated Jan. 12, 2021, 9 Pages.
"Final Office Action Issued in U.S. Appl. No. 16/413,485", dated Jan. 8, 2021, 40 Pages.
"Final Office Action Issued in U.S. Appl. No. 16/413,528", dated Jan. 12, 2021, 22 Pages.
"Non Final Office Action Issued in U.S. Appl. No. 16/413,528", dated Jun. 24, 2021, 24 Pages.

* cited by examiner

STRUCTURE SWITCHING IN A THREE-DIMENSIONAL ENVIRONMENT

BACKGROUND

When creating a three-dimensional (3D) environment, a user may specify various characteristics for the environment. However, providing an ability for the user to change characteristics of the environment after creation is difficult, especially in instances where the user has added content to the 3D environment. As a result, the user may be required to recreate the 3D environment and re-add content in order to change characteristics of the environment.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to structure switching in a three-dimensional (3D) environment. In an example, a 3D environment is authored using an authoring application, wherein the author selects characteristics for the 3D environment and inserts content for consumption by an end user. For example, a structure is selected in which to present the content in the 3D environment. An asset container comprises assets associated with the selected structure, which are included in the 3D environment. In some examples, a common asset container comprises other assets that are included in the 3D environment. End users are able to view the 3D environment using a viewer application.

If the author decides to change the selected structure, an asset container associated with the new structure is identified. In aspects, the asset container associated with the new structure can be substituted for the asset container associated with the previous structure. In this way, assets for the old structure are removed from the 3D environment and assets for the new structure are included instead. Further, customization or content that was added to the 3D environment while the old structure was present are maintained in the 3D environment with the new structure. Thus, a set of asset containers is used generate the 3D environment, wherein asset containers associated with different characteristics (e.g., one or more structures, backgrounds, sounds, etc.) may be added or removed to the set after the initial creation of the 3D environment to change characteristics of the 3D environment without requiring the author to start over with a new 3D environment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
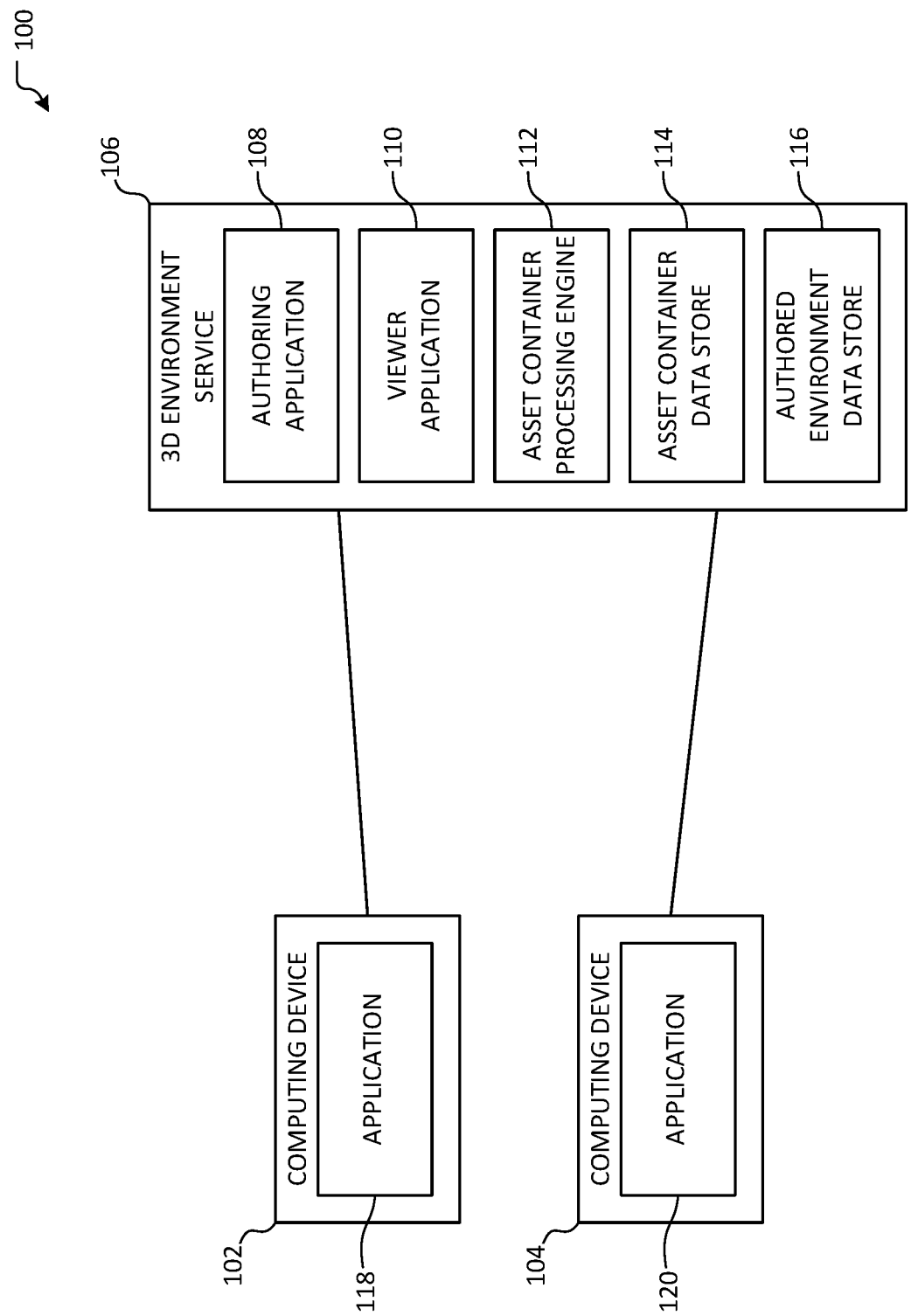
FIG. 1 illustrates an overview of an example system for structure switching in a three-dimensional environment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In an example, a user uses an authoring application to author a three-dimensional (3D) environment. The authoring application enables a user to graphically select various characteristics of the 3D environment, including, but not limited to, one or more structures in the 3D environment, a background of the 3D environment (e.g., a skybox, a skydome, etc.), and/or one or more sounds (e.g., ambient sounds, sounds associated with activities in the 3D environment, etc.). The 3D environment is generated according to the user-selected characteristics, after which the user is able to select and position content within the 3D environment. However, if the user wishes to change a selected characteristic of the environment after the fact, the user may be required to create a new 3D environment with a new set of characteristics and manually repopulate the 3D environment with content accordingly. As a result, it is difficult for the user to select a different structure, add a new structure, or change the 3D background of the 3D environment, among other examples.

Accordingly, aspects of the present disclosure relate to structure switching in a 3D environment. In examples, an asset container is used to store 3D assets for the 3D environment. For example, assets relating to a structure are stored in one asset container, while assets relating to the skybox are stored in another asset container. As used herein, an asset may be a 3D model, a texture, an image, an animation, or a sound, among other assets used to implement or generate aspects of a 3D environment. Thus, when a user selects characteristics associated with a 3D environment, a set of asset containers comprising assets relating to the selected characteristics is determined and used to generate the 3D environment. As a result, if the user wishes to change a characteristic of the 3D environment, the user need not create and manually repopulate a new 3D environment. Rather, the current asset container and related assets associated with the characteristic is identified and removed, thereby enabling a new asset container associated with the updated characteristic to be identified and used instead. Thus, the user need not start over, and previous changes to the 3D environment (e.g., added content, lighting changes, etc.) may be retained after incorporating the updated characteristic.

As used herein, an authoring application is used by an author to create or edit a 3D environment. The authoring application may be a native application, a web application, or any combination thereof, among other examples. In some examples, different types of content may be embedded or included in the 3D environment. Example content includes, but is not limited to, 3D objects (e.g., 3D models, figures, shapes, etc.), 2D objects (e.g., files, images, presentations, documents, web sites, videos, remote resources, etc.), or audio content, among other content. In addition to content added to the 3D environment, one or more assets may be included in the 3D environment (for example, relating to characteristics of the 3D environment). For example, a 3D environment may comprise assets for a structure in which content is placed, assets for a background of the 3D environment, sound assets, or animation assets, among other assets.

An asset container is used to store one or more assets, for example to implement one or more characteristics. In examples, multiple asset containers are used, each of which comprises assets relating to different characteristics that a user may select. For example, a first asset container comprises assets relating to an "amphitheater" structure, while a second asset container comprises assets relating to a "sky gallery" structure. Thus, when a user selects a structure in the authoring application, an asset container associated with the selected structure is used to generate the 3D environment. While examples described herein are discussed with respect to structure selection and switching, it will be appreciated that, in other examples, asset containers may be used to achieve functionality for any of a variety of other characteristics of a 3D environment. For example, there may be different asset containers for sounds, backgrounds, or texture themes (e.g., such that the same 3D models may be used but different textures are used to provide a different appearance). In examples, a "common" asset container is used, wherein the common asset container comprises assets that are common to multiple 3D environments. For example, if the authoring application offers four backgrounds, each of which are outside, a common asset container may comprise a shared skybox texture or shared plant models, among other assets. In some instances, a common asset container comprises assets that are common to all 3D environments.

In examples, a preference associated with a characteristic is stored by or associated with an asset container for the characteristic. For example, a preference specifying a light or dark theme associated with a structure is stored by or associated with the asset container for the structure. Thus, as a result of using an asset container to store associated preferences, a user is able to change a characteristic of the 3D environment while retaining preferences for other characteristics that are unchanged. Returning to the example theme preference, if a user changes the 3D background of the environment, the theme selection is retained as a result of the selection being associated with an asset container for the structure rather than an asset container for the old background. In other examples, a user provides a custom asset container comprising one or more custom assets for inclusion in the 3D environment. It will be appreciated that any number of common or custom asset containers may be used.

An authored 3D environment is stored as an environment data file. The environment data file comprises information relating to asset containers, assets, and content for inclusion in the 3D environment. In examples, a viewer application generates a 3D environment based on an environment data file for consumption by an end user. In examples, a 3D environment may be a virtual space, such as a virtual reality (VR) world, or may be a real world space in which content may be displayed or layered on top of the real world, among other augmented reality (AR) or VR techniques. The viewer application is executed by a computing device, such as a desktop computer or a smartphone. In an example, a 3D environment is experienced using any of a wide variety of VR or AR devices, ranging from low-end devices (e.g., GOOGLE CARDBOARD) to high-end devices (e.g., MICROSOFT HOLOLENS, OCULUS RIFT, HTC VIVE, etc.). Device- or platform-specific idiosyncrasies may be handled by the viewer application, thereby making such idiosyncrasies invisible to both the end user and the author of the 3D environment. As used herein, an "author" and an "end user" are each a type of user of a computing device. It will be appreciated that tasks described with respect to an author may, in other examples, be performed by an end user, and vice versa.

FIG. 1 illustrates an overview of an example system 100 for structure switching in a three-dimensional environment. As illustrated, system 100 comprises computing devices 102 and 104, and 3D environment service 106. In an example, computing devices 102 and 104 may be any of a variety of computing devices, including, but not limited to, a mobile computing device, a laptop computing device, a tablet computing device, or a desktop computing device. In some examples, 3D environment service 106 is provided as part of a collaborative, communication, or productivity platform. It will be appreciated that while 3D environment service 106 and elements 108-116 are illustrated as separate from computing devices 102 and/or 104, one or more of elements 108-116 may be provided by computing devices 102 and/or 104 other examples. As an example, computing device 102 may comprise authoring application 108, while computing device 104 may comprise viewer application 110.

System 100 illustrates 3D environment service 106 as comprising authoring application 108, viewer application 110, asset container processing engine 112, asset container data store 114, and authored environment data store 116. Authoring application 108 is used to author a 3D environment according to aspects disclosed herein. In an example, authoring application 108 provides a graphical user interface (GUI) with which a user graphically designs a 3D environment. As an example, a user specifies characteristics of the 3D environment by selecting from a set of options. Example characteristics include, but are not limited to, a structure in which to present content, a background, and/or sounds. As another example, a user selects whether a light or dark theme is used, among other examples. Authoring application 108 may further enable a user to select content for display within the 3D environment. As an example, the user may position content at specific locations within the 3D environment. An end user may use viewer application 110 to consume the 3D environment and interact with the content, as discussed in greater detail below.

As described above, an authored 3D environment comprises assets stored by one or more asset containers. In examples, authoring application 108 enables a user to select characteristics of a 3D environment according to available asset containers, as may be stored by asset container data store 114. For example, asset container data store 114 stores asset containers relating to different structures, different backgrounds, and/or different sounds, among other examples. As a result, authoring application 108 presents options relating to such asset containers, such that a user is able to select assets corresponding to the asset containers for inclusion in the 3D environment accordingly. Preferences related to an asset container may also be presented by authoring application 108. For example, a preference for a light or dark theme associated with a structure may be presented. It will be appreciated that a variety of other preferences may be used, including, but not limited to, a sound effect volume, a time of day, or a scale factor. In some examples, asset container data store 114 stores one or more common asset containers, wherein the common asset containers comprise assets that are common to one or more other asset containers. One or more common asset containers are used to generate the 3D environment in addition to option-specific asset containers according to aspects described herein.

3D environment service 106 is illustrated as further comprising asset container processing engine 112. In examples, authoring application 108 uses asset container processing engine 112 to process one or more asset containers to generate a graphical representation of a 3D environment for an author to modify and/or view. For example, asset container processing engine 112 evaluates assets specified by an asset container and adds the specified assets to the 3D environment. Asset container processing engine 112 evaluates preferences associated with an asset container. For example, a light theme preference indication is used to select assets associated with the light theme, whereas a dark them preference indication may be used to select assets associated with the dark theme.

In examples, an asset container references an asset using a uniform resource locator (URL), uniform resource identifier (URI), or globally unique identifier (GUID), among other examples. Accordingly, asset container processing engine 112 evaluates a reference to an asset and retrieves the asset. In other examples, an asset is stored within an asset container, such that asset container processing engine 112 extracts the asset from the asset container. When assets are added to the 3D environment, they are associated with the asset container. For example, an asset container may have an identifier (e.g., a name, a GUID, etc.) that is used to associate an asset with the asset container. As a result, asset container processing engine 112 is able to identify a set of assets associated with a given asset container, thereby enabling asset container processing engine 112 to remove the set of assets when a user changes a characteristic of a 3D environment according to aspects described herein.

A 3D environment authored using authoring application 108 is stored as an environment data file. The environment data file comprises information relating to selected characteristics, content, custom assets, and/or other information. For example, the environment data file may indicate a structure or a background, or may comprise a reference to one or more asset containers associated with such characteristics (e.g., as may be stored by asset container data store 114). As another example, information relating to selected content comprises a location at which to display the content and is stored as one or more references to the content or, in other examples, the environment data file stores the content itself. It will be appreciated that the information stored by an environment data file described herein is provided as an example. The environment data file may be stored in authored environment data store 116 for consumption by an end user (e.g., using viewer application 110) or for further revision using authoring application 108 (e.g., by the same author and/or a different author, etc.).

In some examples, authoring application 108 is a web-based application, wherein a computing device of a user (e.g., computing device 102 or computing device 104) may access authoring application 108 using a web browser. In other examples, authoring application 108 may be an executable application, which may be retrieved and executed by a user's computing device.

Viewer application 110 generates a 3D environment based on an environment data file to enable a user to view, explore, and/or interact with the 3D environment and content located therein. In an example, viewer application 110 is a web-based application, wherein a computing device of a user (e.g., computing device 102 or computing device 104) accesses viewer application 110 using a web browser. In other examples, viewer application 110 may be an executable application, which may be retrieved and executed by a user's computing device. According to aspects disclosed herein, viewer application 110 processes an environment data file to identify one or more asset containers with which to generate the 3D environment. Viewer application 110 may populate the generated 3D environment with content as specified by the environment data file. For example, viewer application 110 uses asset container processing engine 112 to generate a 3D environment using assets from one or more asset containers. In an example, viewer application 110 may use any of a variety of 3D rendering engines and may handle device- and/or engine-specific implementation details when rendering the 3D environment, such that the author of the environment data file need not be familiar with device- and/or engine-specific idiosyncrasies.

Authored environment data store 116 stores one or more environment data files, as may be authored by authoring application 108. In some examples, an "environment data file" as is used herein is stored as a file on a file system, an entry in a database, or may be stored using any of a variety of other data storage techniques. In an example where authoring application 108 is a locally-executed application, at least a part of an authored environment data file may be received from one of computing devices 102 and 104, and stored using authored environment data store 116. In some examples, viewer application 110 retrieves an environment data file from authored environment data store 116, which, in conjunction with one or more asset containers and associated assets from asset container data store 114, may be used to generate a 3D environment. In an example where a viewer application is a locally-executed application, aspects of one or more asset containers may be stored local and/or remote to the device executing the application, and at least a part of an environment data file may be retrieved from authored environment data store 116. In some examples, the environment data file may be streamed or retrieved in chunks, so as to reduce bandwidth consumption and/or to improve responsiveness. It will be appreciated that other data storage and/or retrieval techniques may be used without departing from the spirit of this disclosure.

Applications 118 and 120 of computing devices 102 and 104, respectively, may be any of a variety of applications. In an example, application 118 and/or 120 is an authoring application as described above, wherein a user of computing device 102 and/or 104 may use the application to author a 3D environment described by an environment data file. In some examples, the environment data file is stored by authored environment data store 116. In another example, application 118 and/or 120 is a viewer application as described above, which may be used to view, render, and/or explore a 3D environment defined at least in part by an environment data file. In other examples, computing device 102 and/or 104 comprises an asset container data store similar to asset container data store 114 and/or an authored environment data store similar to authored environment data store 116. In instances where viewer application 110 is a web-based application, application 118 and/or 120 is a web browser that is used to access viewer application 110. In examples, a hardware AR and/or VR device (not pictured) may be attached to computing devices 102 and/or 104 and used to view and/or engage with a rendered 3D environment. For example, a VR or AR headset may be used.

Figure 2:
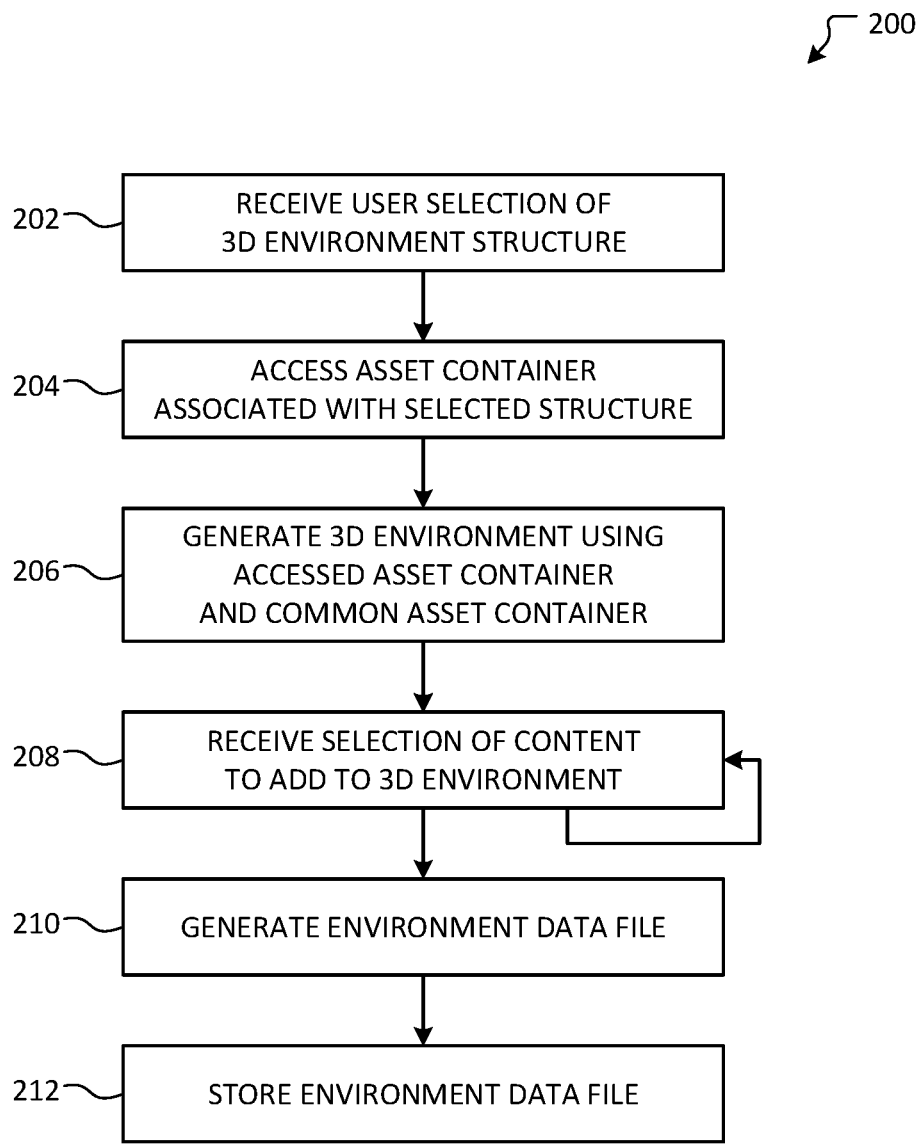
FIG. 2 illustrates an overview of an example method for generating an environment data file based on a selected structure according to aspects disclosed herein.

FIG. 2 illustrates an overview of an example method 200 for generating an environment data file based on a selected structure according to aspects disclosed herein. In examples, aspects of method 200 are performed by an authoring application, such as authoring application 108 in FIG. 1. The authoring application may be a web-based application and/or a native application executing on a computing device, such as computing device 102 or 104 in FIG. 1. Method 200 begins at operation 202, where a user selection of a 3D environment structure is received. In examples, the user selects the structure from a set of different structures, as may be displayed by the authoring application. The user selection may be received as a result of the user interacting with a user interface element, such as a drop down menu or a palette of available options, among other examples. It will be appreciated that while aspects of method 200 are described with respect to selecting a 3D structure, similar techniques may be used to select from a variety of other options relating to other characteristics (e.g., a background, sounds, etc.).

Flow progresses to operation 204, where an asset container associated with the selected structure is accessed. The asset container comprises assets relating to the structure. For example, the asset container comprises one or more 3D models such as a building model, related decorations (e.g., artwork, lamps, furniture, etc.), etc. As another example, the asset container comprises sounds and/or textures associated with the selected structure. The asset container may be accessed from an asset container data store, such as asset container data store 114 in FIG. 1. In some examples, accessing the asset container further comprises accessing a common asset container associated with the accessed container, wherein the common asset container comprises assets that are shared by the selected structure and at least one other structure.

At operation 206, a 3D environment is generated using the asset container associated with the selected structure and a common asset container. In examples, aspects of operation 206 are performed by an asset container processing engine, such as asset container processing engine 112 in FIG. 1. Assets from the accessed asset container are added to the 3D environment, as are assets from the common asset container. It will be appreciated that, in other examples, additional asset containers are used. For example, there may be multiple asset containers associated with the selected structure or there may be multiple common asset containers.

Moving to operation 208, a selection is received indicating content to add to the 3D environment. Example content includes, but is not limited to, 3D objects (e.g., 3D models, figures, shapes, etc.) or 2D objects (e.g., files, images, presentations, documents, web sites, videos, remote resources, etc.), among other content. The selection may indicate a location in the 3D environment at which the content should be displayed. An arrow returning to operation 208 is illustrated in method 200 to indicate that, in some examples, multiple selections are received. It will be appreciated that, in other examples, operation 208 is omitted and no content is selected for inclusion in the 3D environment.

At operation 210, an environment data file is generated. In examples, operation 210 is performed as a result of receiving a save indication or a publish indication. As described herein, the environment data file comprises information relating to asset containers that were used to generate the 3D environment at operation 206 (e.g., the asset container associated with the selected structure and the common asset container, associated preferences, etc.), as well as information relating to the content selected at operation 208 for inclusion in the 3D environment. In some examples, the environment data file comprises information relating to other selected characteristics (e.g., a background, sounds, etc.), custom assets, and/or other information.

Flow progresses to operation 212, where the environment data file is stored. As an example, the environment data file is stored in an authored environment data store, such as authored environment data store 116 in FIG. 1. In another example, the environment data file is stored using a local storage device. In some examples, at least a part of the environment data file is stored using the local storage device, while another part of the environment data file is stored by the authored environment data store. It will be appreciated that any of a variety of techniques may be used to store the environment data store. Flow terminates at operation 212.

Figure 3:
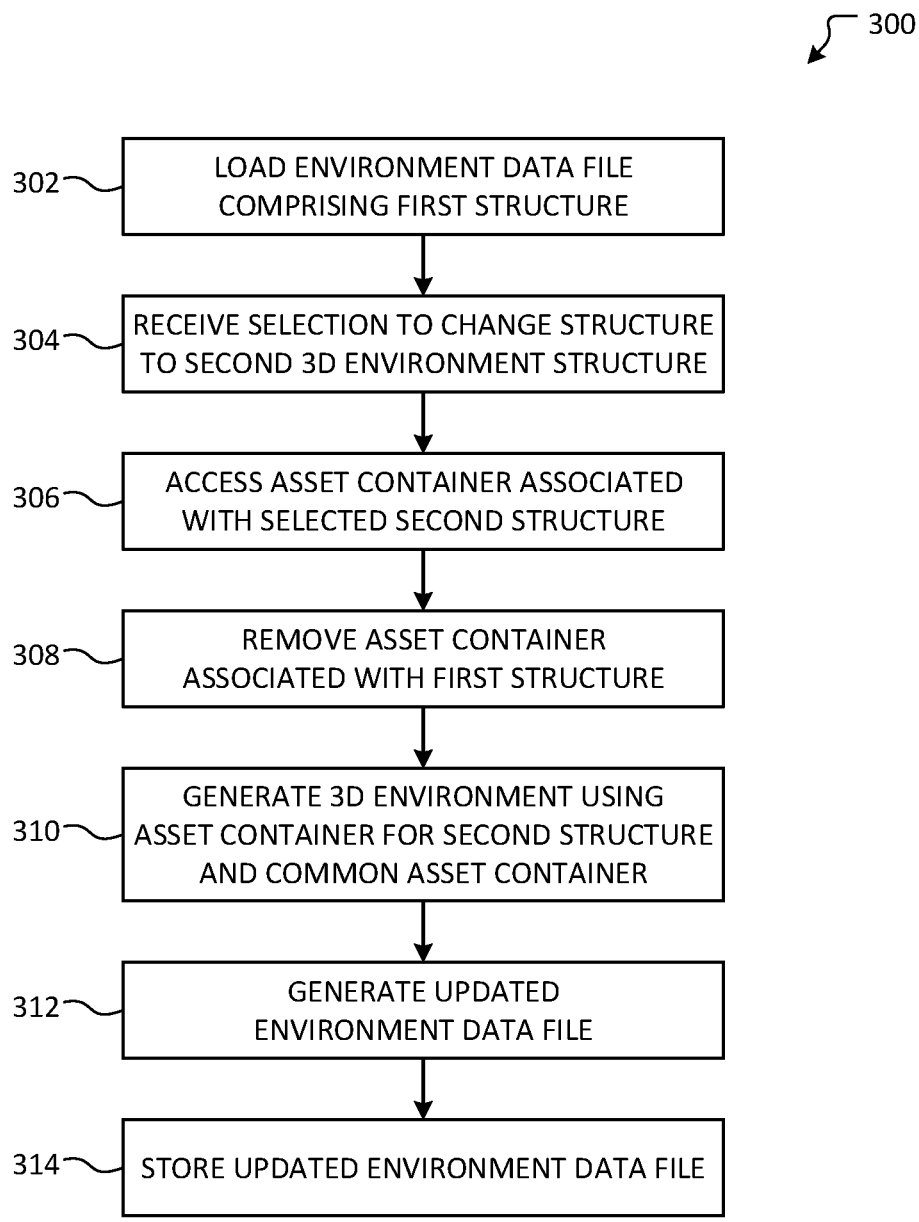
FIG. 3 illustrates an overview of an example method for updating a three-dimensional environment based on a user selection to change a structure.

FIG. 3 illustrates an overview of an example method 300 for updating a three-dimensional environment based on a user selection to change a structure. In examples, aspects of method 300 are performed by an authoring application, such as authoring application 108 in FIG. 1. The authoring application may be a web-based application and/or a native application executing on a computing device, such as computing device 102 or 104 in FIG. 1. Method 300 begins at operation 302, where an environment data file comprising a first 3D structure is loaded. In examples, the environment data file is loaded from an authored environment data store, such as authored environment data store 116. In another example, the environment data file is loaded from a local storage device. Loading the environment data file comprises generating a graphical representation of the 3D environment in the authoring application, thereby enabling a user to continue editing the 3D environment. In some examples, the environment data file was generated by performing aspects of method 200 described above. It will be appreciated that, in some instances, operation 302 may be omitted, such as in instances where the 3D environment is already loaded by the authoring application.

At operation 304, a selection is received to change the structure of the 3D environment from the first structure to a second structure. As an example, the indication is received as a result of a user changing a selected option in a dropdown or clicking on a different option of a displayed palette, among other examples. While aspects of method 300 are described with respect to changing a structure of a 3D environment, it will be appreciated that similar techniques may be used to change other characteristics of a 3D environment.

Flow progresses to operation 306, where an asset container associated with the selected second structure is accessed. The asset container comprises assets relating to the second structure. For example, the asset container comprises one or more 3D models such as a building model, related decorations (e.g., artwork, lamps, furniture, etc.), etc. As another example, the asset container comprises sounds and/or textures associated with the second structure. The asset container may be accessed from an asset container data store, such as asset container data store 114 in FIG. 1. In some examples, accessing the asset container for the second structure further comprises accessing a common asset container associated with the asset container for the second structure, wherein the common asset container comprises assets that are shared by the second structure and at least one other structure. The asset container may be stored remotely from the computing device, and may therefore be retrieved in response to the selection. In examples, there may be relatively high storage and/or memory requirements associated with the number of available asset containers, such that it may be beneficial to load asset containers and related assets on-demand.

At operation 308, an asset container associated with the first structure is removed from the 3D environment. In examples, aspects of operation 308 are performed using an asset container processing engine, such as asset container processing engine 112 in FIG. 1. Removing the asset container associated with the first structure comprises identifying assets associated with the asset container and removing them from the 3D environment. In examples, assets are identified based on an identifier associated with the asset container for the first structure. In some instances, a common asset container associated with the asset container for the first structure may no longer be required, as may be the case if the first structure and the second structure do not share any common assets. It will be appreciated that, in other instances, assets associated with a common asset container are retained in the 3D environment, as may be the case if there are common assets shared between the first structure and the second structure, or if there are other assets in the 3D environment that are generally used for 3D environments. In examples, where an the asset container associated with the second structure is loaded on-demand, a placeholder indication may be generated in the 3D environment to indicate that the second asset container is being loaded. The indication may be generated before or after assets associated with the first structure are removed. In examples, the visual indication may resemble the shape of the first structure or the second structure (e.g., in the shape of twinkling stars, smoke, etc.).

Moving to operation 310, a 3D environment is generated using the asset container for the second structure and a common asset container. In examples, aspects of operation 310 are performed by an asset container processing engine, such as asset container processing engine 112 in FIG. 1. Generating the 3D environment may comprise updating a pre-existing generated 3D environment, as may have been generated at operation 302. Assets from the asset container for the second structure are added to the 3D environment, as are assets from the common asset container. In some instances, assets from the common asset container are already present in the 3D environment and are therefore not re-added. It will be appreciated that, in other examples, additional asset containers are used. For example, there may be multiple asset containers associated with the second structure or there may be multiple common asset containers. As described above, the added assets are associated with a respective asset container.

At operation 312, an updated environment data file is generated. In examples, operation 312 is performed as a result of receiving a save indication or a publish indication. As described herein, the environment data file comprises information relating to asset containers used to generate the 3D environment at operation 310 (e.g., the asset container associated with the second structure and the common asset container), as well as information relating to content that a user may have selected for inclusion in the 3D environment. In some examples, the environment data file comprises information relating to other selected characteristics (e.g., a background, sounds, etc.), custom assets, and/or other information. In some examples, references to assets associated with the asset container that was removed at operation 308 are removed from the environment data file, while references to assets associated with the asset container associated with the second structure are added to the environment data file.

Flow progresses to operation 314, where the updated environment data file is stored. As an example, the environment data file is stored in an authored environment data store, such as authored environment data store 116 in FIG. 1. In another example, the environment data file is stored using a local storage device. In some examples, at least a part of the environment data file is stored using the local storage device, while another part of the environment data file is stored by the authored environment data store. It will be appreciated that any of a variety of techniques may be used to store the environment data store. Flow terminates at operation 314.

Figure 4:
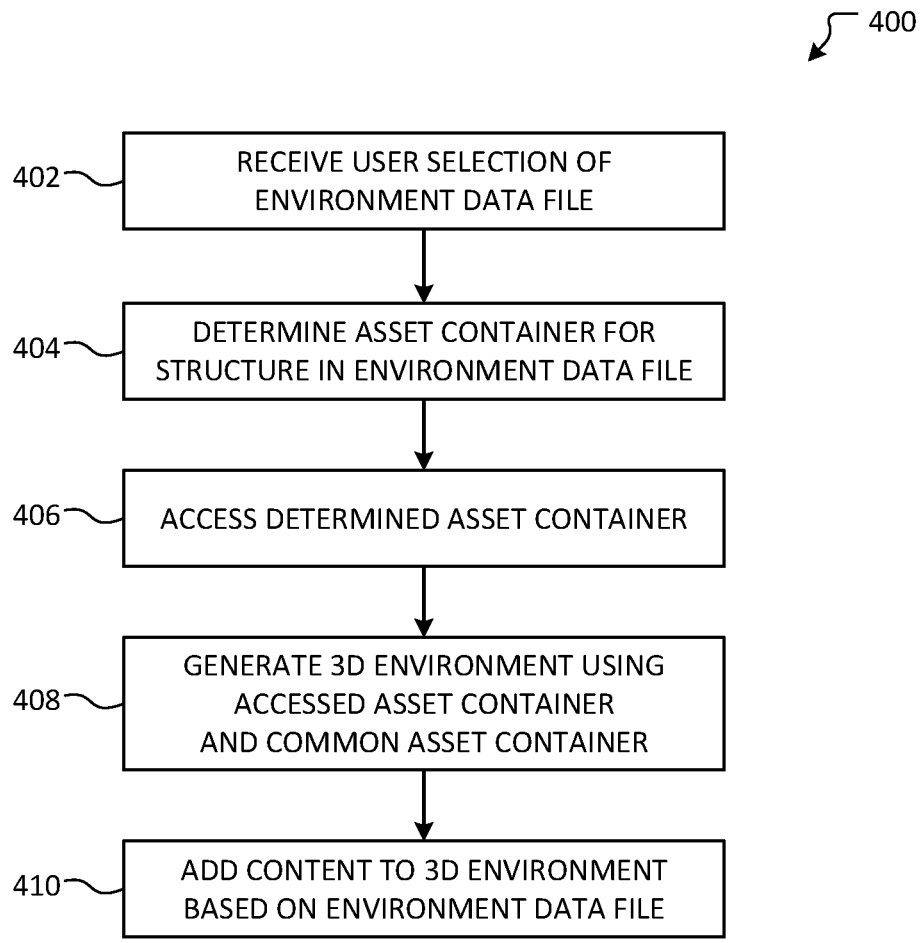
FIG. 4 illustrates an overview of an example method for generating a three-dimensional environment based on an environment data file.

FIG. 4 illustrates an overview of an example method 400 for generating a three-dimensional environment based on an environment data file. In examples, aspects of method 400 are performed by a viewer application, such as viewer application 110 in FIG. 1. The viewer application may be a web-based application and/or a native application executing on a computing device, such as computing device 102 or 104 in FIG. 1. Method 400 begins at operation 402, where a user selection of an environment data file is received. As an example, the environment data file is selected by a user browsing a webpage, wherein a link on the webpage directs a web browser to the environment data file. As another example, a user accesses the environment data file using a file browser, or selects the environment data file from a list of authored environment data files (e.g., as may be stored by an authored environment data store, such as authored environment data store 116 in FIG. 1). While example user selections are discussed herein, it will be appreciated that other user selections may be received in other examples.

At operation 404, an asset container is determined for a structure in the environment data file. In some examples, the environment data file references an asset container using a URL, a URI, or a GUID, among other examples. In another example, the environment data file comprises the asset container itself rather than a reference to it. In such examples, the environment data file may further comprise one or more assets of the asset container.

Flow progresses to operation 406, where the determined asset container is accessed. The asset container may be accessed from an asset container data store, such as asset container data store 114 in FIG. 1. In some examples, accessing the asset container for the second structure further comprises accessing a common asset container associated with the asset container for the second structure, wherein the common asset container comprises assets that are shared by the second structure and at least one other structure.

At operation 408, a 3D environment is generated using the accessed asset container and a common asset container. In examples, aspects of operation 408 are performed by an asset container processing engine, such as asset container processing engine 112 in FIG. 1. Assets from the asset container for the structure specified by the environment data file are added to the 3D environment, as are assets from the common asset container. It will be appreciated that, in other examples, additional asset containers are used. For example, there may be multiple asset containers associated with the structure or there may be multiple common asset containers. In other examples, there is no common asset container and only the accessed asset container is used. According to aspects described herein, assets added to the 3D environment may be associated with their respective asset containers.

Moving to operation 410, content is added to the 3D environment as specified by the environment data file. As an example, a 2D representation of content specified by the environment data file is generated for a document, a webpage, or other two-dimensional content. As another example, a 3D object may be rendered as floating in the model or may be placed on a pedestal. It will be appreciated that while example content and display techniques are described herein, in of a variety of content and display techniques may be used to present the content in the 3D environment. At least a part of the content may be stored by the environment data file, may be stored locally elsewhere on the device, or may be retrieved from a remote location. Flow terminates at operation 410.

Figure 5A:
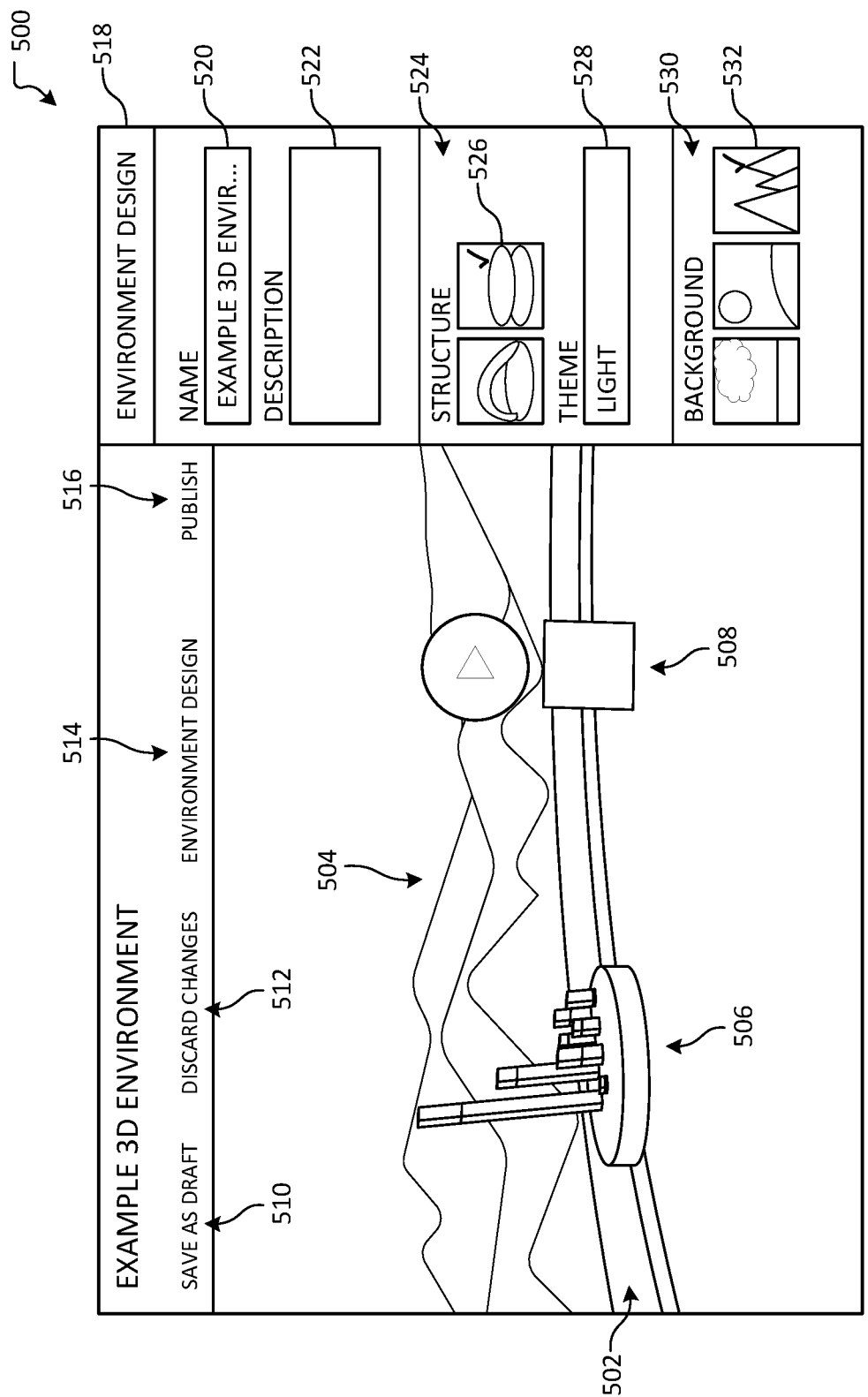
FIG. 5A illustrates an example user interface for authoring a three-dimensional environment according to aspects described herein.

FIG. 5A illustrates an example user interface 500 for authoring a three-dimensional environment according to aspects described herein. In examples, user interface 500 is a user interface of an authoring application, such as authoring application 108 in FIG. 1. As illustrated, the example 3D environment comprises content items 506 and 508. Content items 506 and 508 are displayed in structure 502 with background 504 in the distance. According to aspects described herein, an author may have selected structure 502 and background 504 when the example 3D environment was created. Similarly, content items 506 and 508 may have been added to the 3D environment using the authoring application.

Example user interface 500 further comprises "save as draft" control 510, "discard changes" control 512, "environment design" control 514, and "publish" control 516. In examples, save as draft control 510 generates a draft environment data file, which may be stored locally on the computing device. In another example, the draft environment data file is stored in an authored environment data store with a flag indicating it is a draft. Accordingly, the draft 3D environment may be available to one or more authors, but may not be widely available until it is published. Discard changes control 512 may be used to revert any changes to the 3D environment back to a state of the 3D environment as was last saved (e.g., using save as draft control 510 or publish control 516). Publish control 516 publishes the authored 3D environment for consumption by other users. For example, the environment data file is stored using an authored environment data store from which other users may access the environment data file and consume the environment data file using a viewer application. In examples, actuating environment design control 514 causes environment design panel 518 to displayed, from which characteristics of the 3D environment may be changed.

As illustrated, environment design panel 518 enables a user to specify a name 520 of the environment, as well as a description 522. Environment design panel 518 further comprises structure selector 524, theme selector 528, and background selector 530. Structure selector 524 comprises two available structures for the 3D environment, each of which are associated with an asset container according to aspects described herein. Structure 526 is selected, as indicated by the checkmark in the upper right-hand corner. Theme selector 528 displays available themes associated with a selected structure. As an example, a "light" theme and a "dark" theme are available. Theme selector 528 is illustrated as a dropdown menu with which a theme of the 3D environment is selected. According to aspects disclosed herein, a theme selected using theme selector 528 is associated with the asset container for structure 526. Background selector 530 is illustrated as listing three available backgrounds from which a user can choose. Example user interface 500 indicates that background 532 is selected, as indicated by the checkmark in the upper right-hand corner. It will be appreciated that while example selectors 524, 528, and 530 are illustrated in example user interface 500, a variety of other selection techniques may be used.

Figure 5B:
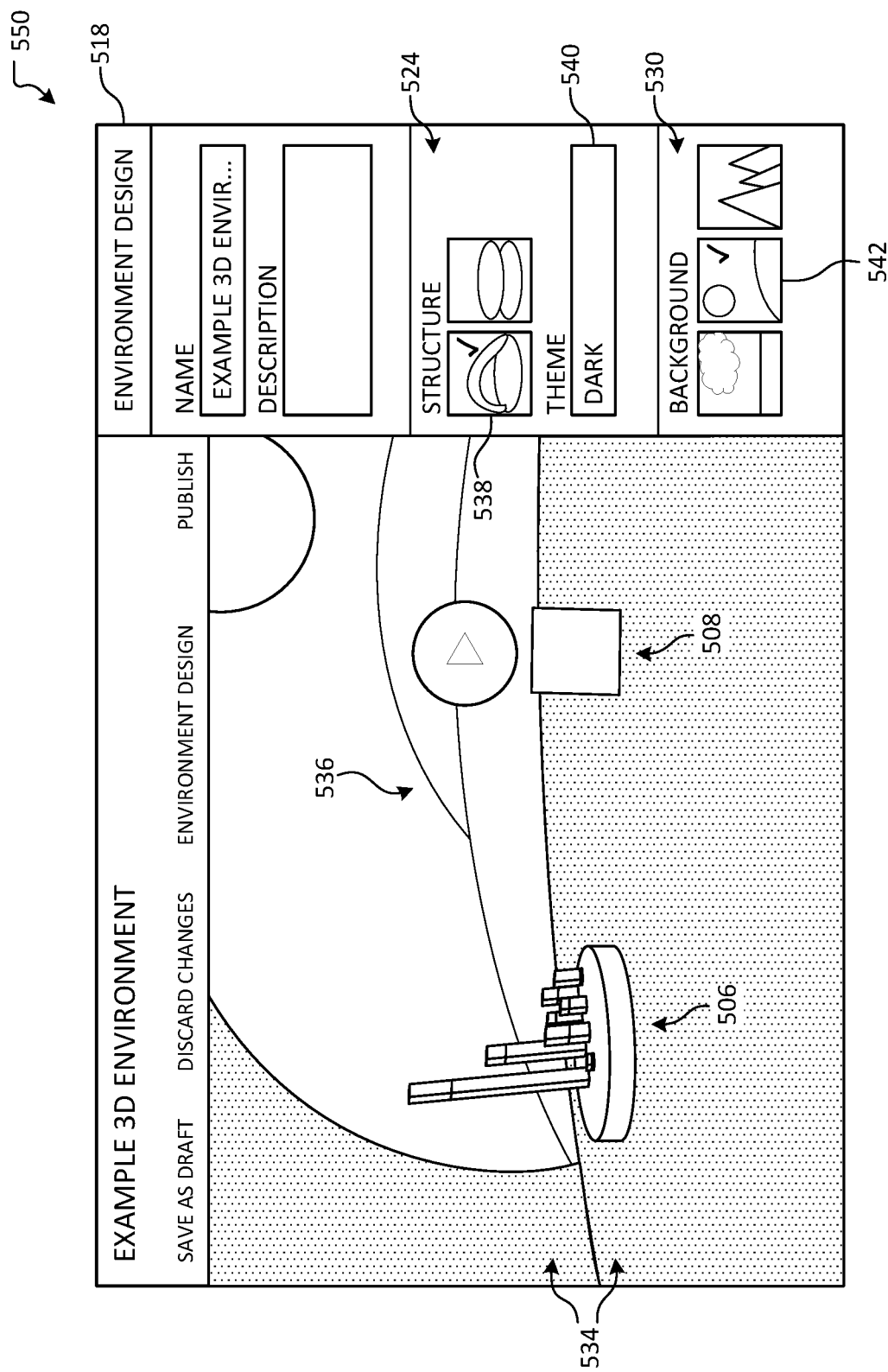
FIG. 5B illustrates another view of the example user interface in FIG. 5A, where characteristics of the environment have been changed according to aspects described herein.

In some examples, if the user wishes to change a selected structure, theme, or background, the user may be required to create a new 3D environment and re-add content items 506 and 508. By contrast, according to aspects described herein, a user is able to change such characteristics as illustrated in FIG. 5B. Thus, FIG. 5B illustrates another view 550 of the example user interface 500 in FIG. 5A, where characteristics of the three-dimensional environment have been changed according to aspects described herein. It will be appreciated that the characteristics illustrated in FIGS. 5A and 5B are provided as examples and that, in other examples, additional, alternate, or fewer characteristics may be used. Additionally, a number of aspects depicted in FIG. 5B are described above in the context of FIG. 5A and, thus, are not necessarily described further.

As compared to FIG. 5A, FIG. 5B illustrates environment design panel 518 as comprising a selection of structure 538 in structure selector 524 and a selection of background 542 in background selector 530, both of which are illustrated by checkmarks in the upper right-hand corners. Additionally, a "dark" theme is shown in theme selector 540. Accordingly, the 3D environment has been updated to comprise assets associated with a different set of asset containers. For example, the updated set of asset containers were determined based on the changed user selections, aspects of which were described with respect to method 300 in FIG. 3. As illustrated, view 550 now comprises structure 534 (as compared to structure 502 in FIG. 5A) and background 536 (as compared to background 504 in FIG. 5A). Additionally, structure 534 is displayed using a dark theme. The user preference indication for the dark theme may be associated with the asset container for structure 538. View 550 further illustrates that content items 506 and 508 are retained in the 3D environment, as a result of implementing aspects described herein. Thus, the user need not create a new 3D environment in order to change the characteristics of the 3D environment.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
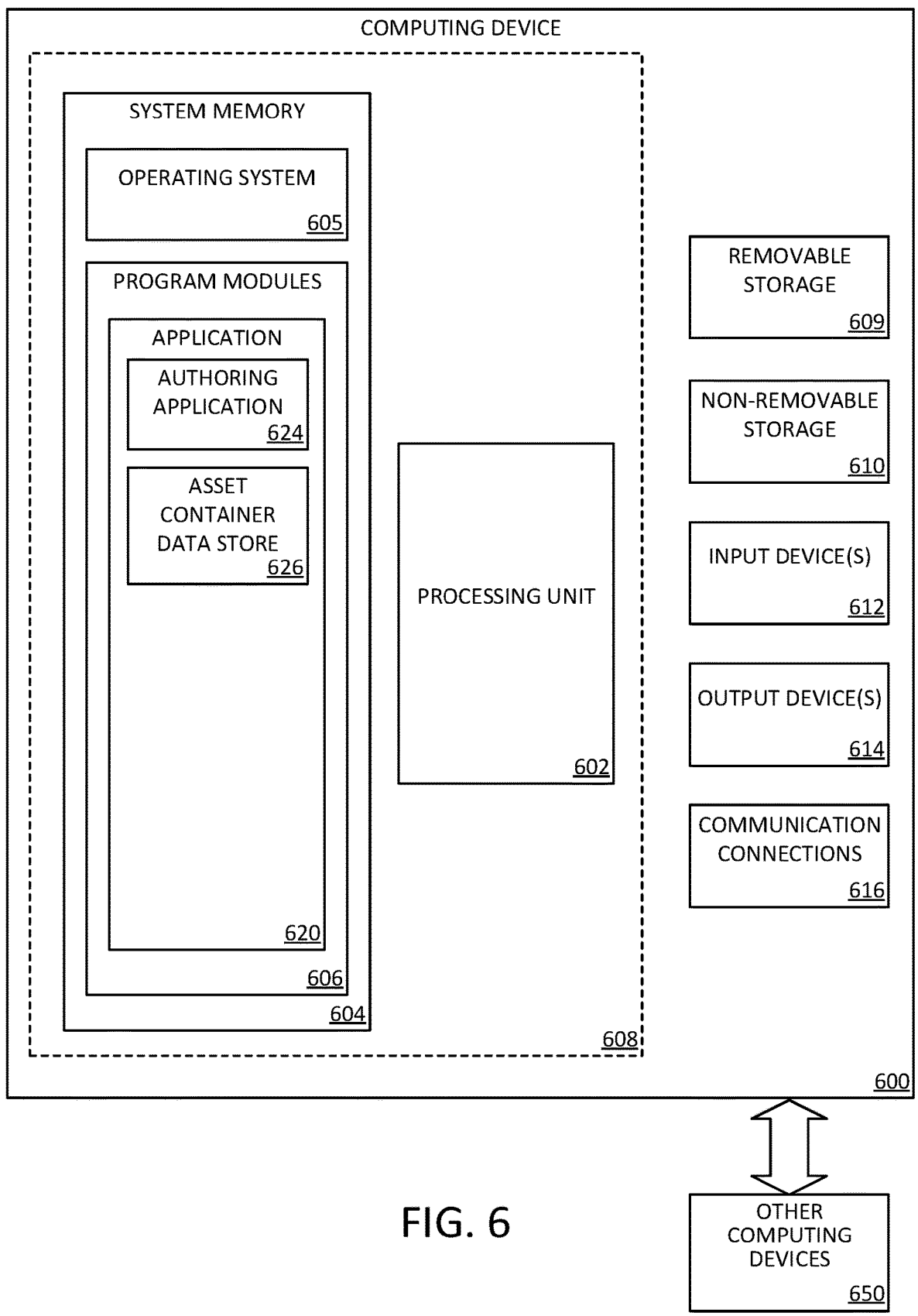
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including the computing devices 102 and 104 and the 3D environment service 106. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store authoring application 624 and asset container data store 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
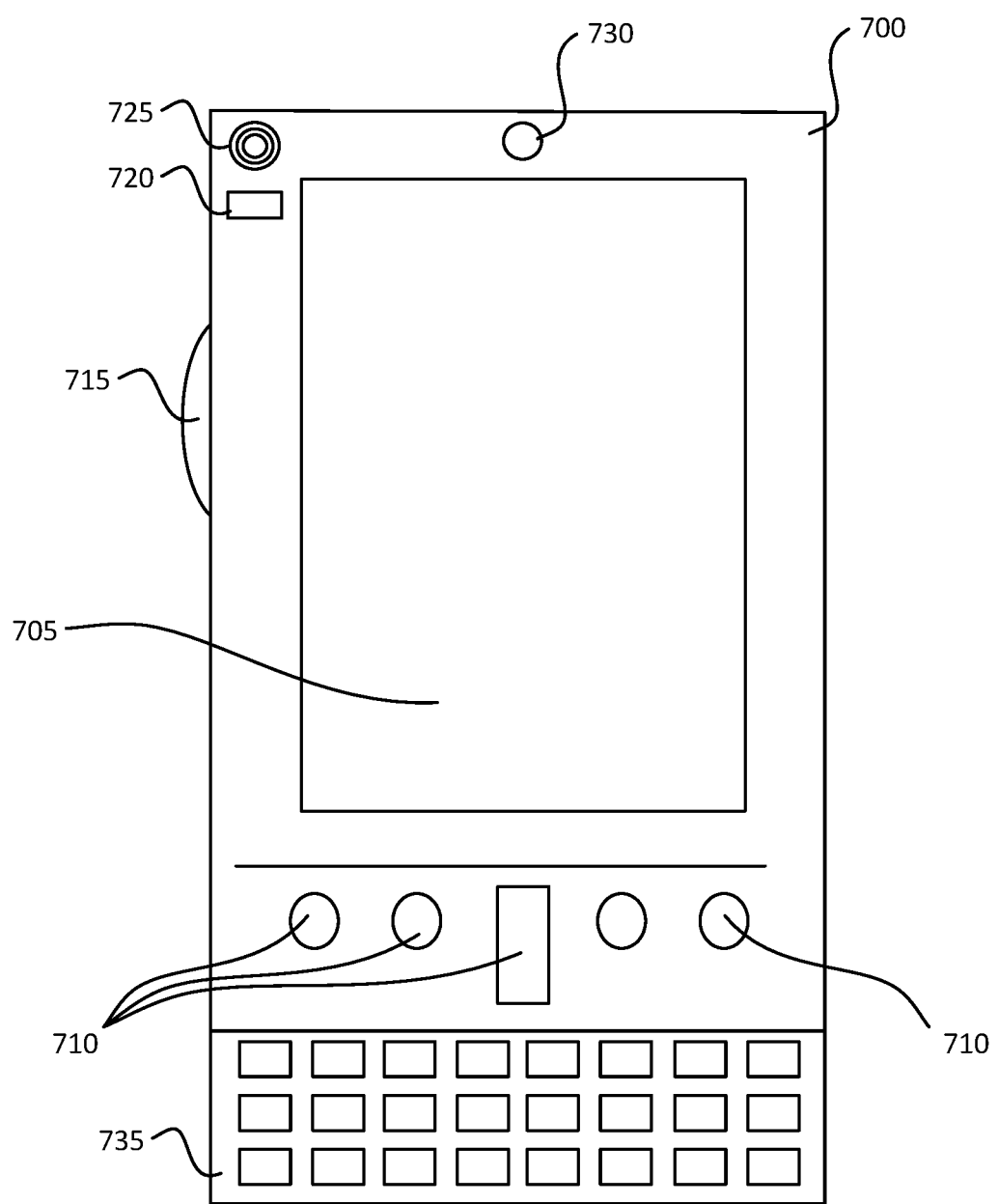
FIGS. 7A and 7B are simplified block diagrams of a mobile computing device with which aspects of the present disclosure may be practiced.
Figure 7B:
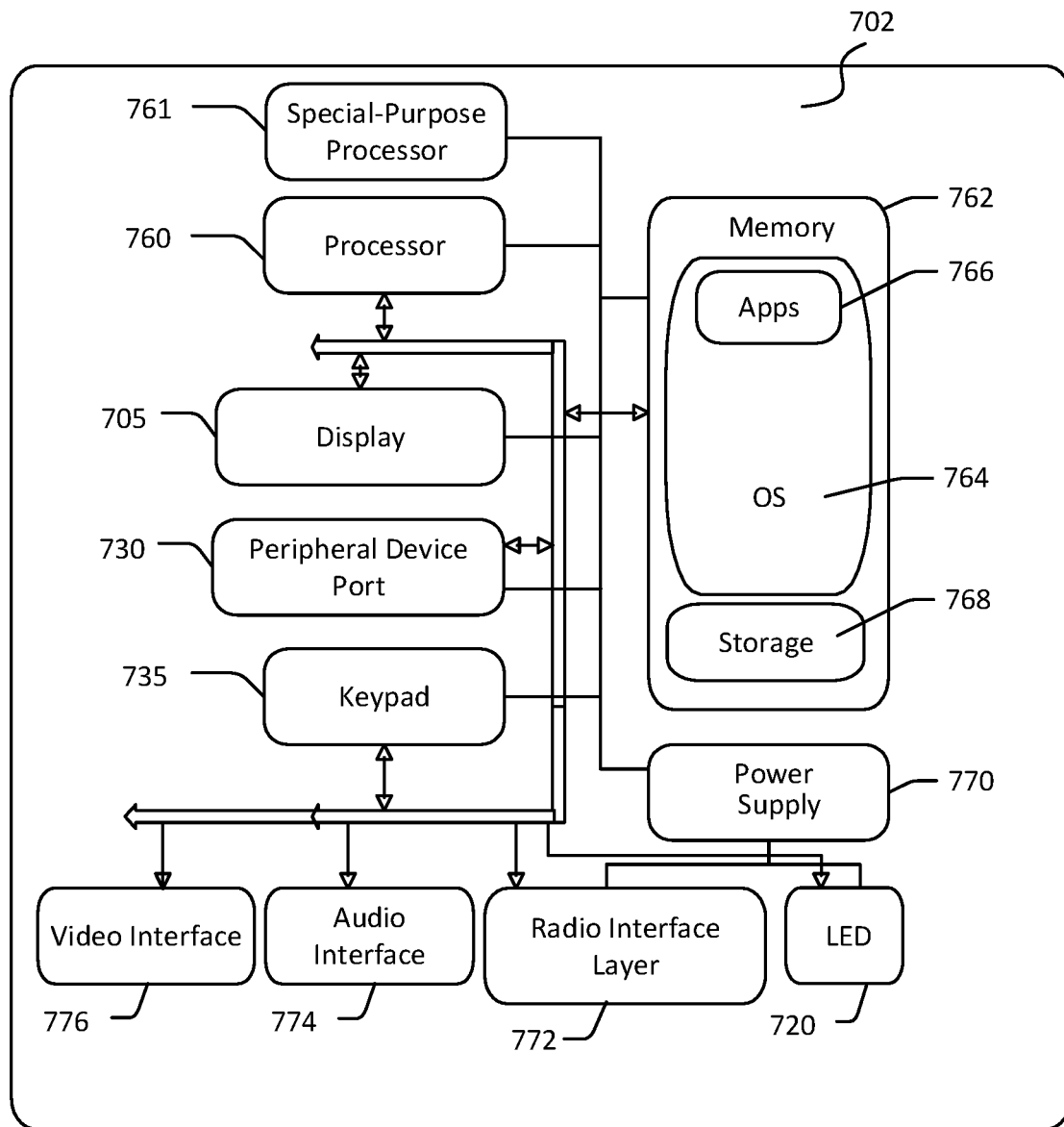

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a web browser, an authoring application, a viewer application, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
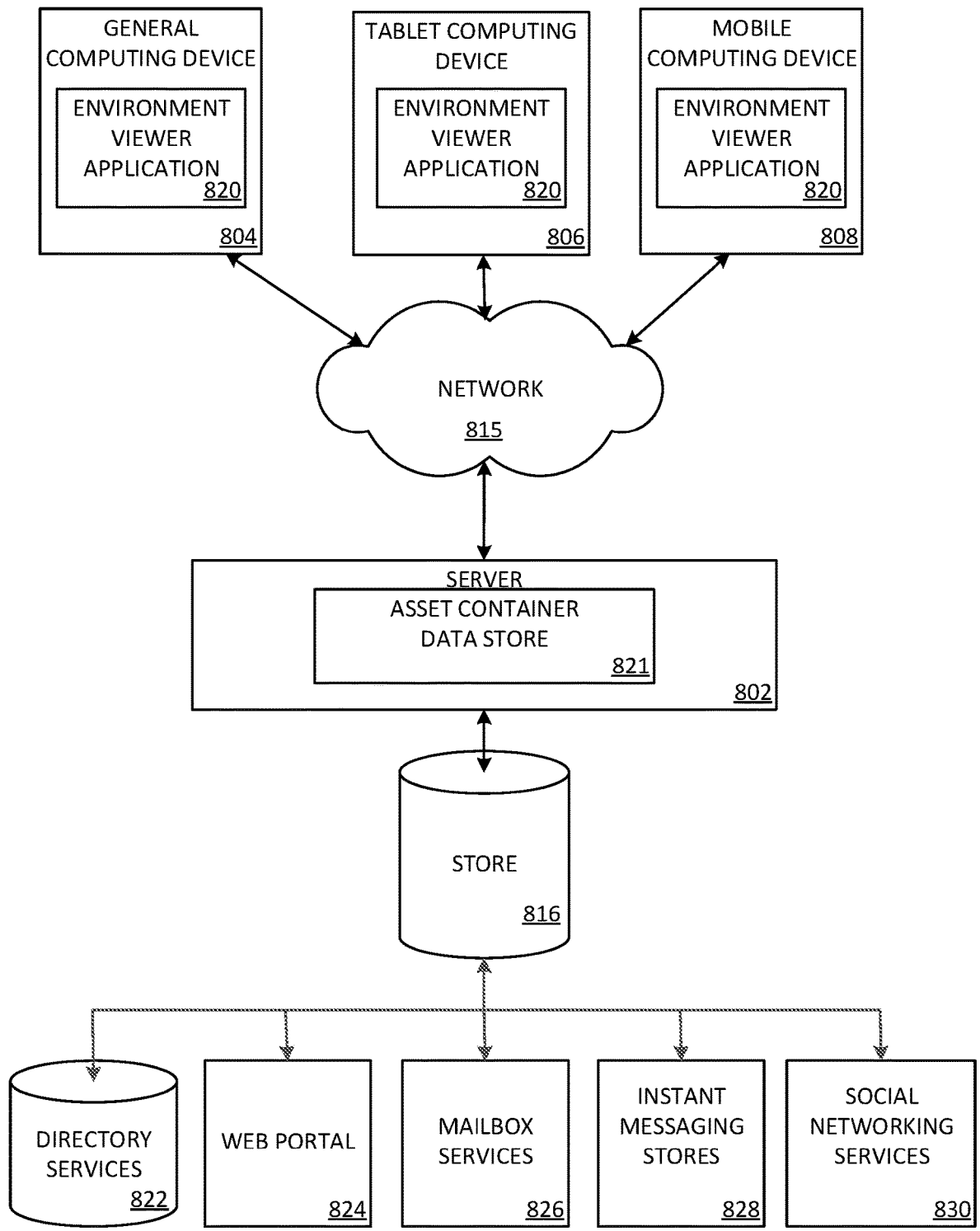
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An environment view application 820 may be employed by a client that communicates with server device 802, and/or the asset container data store 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
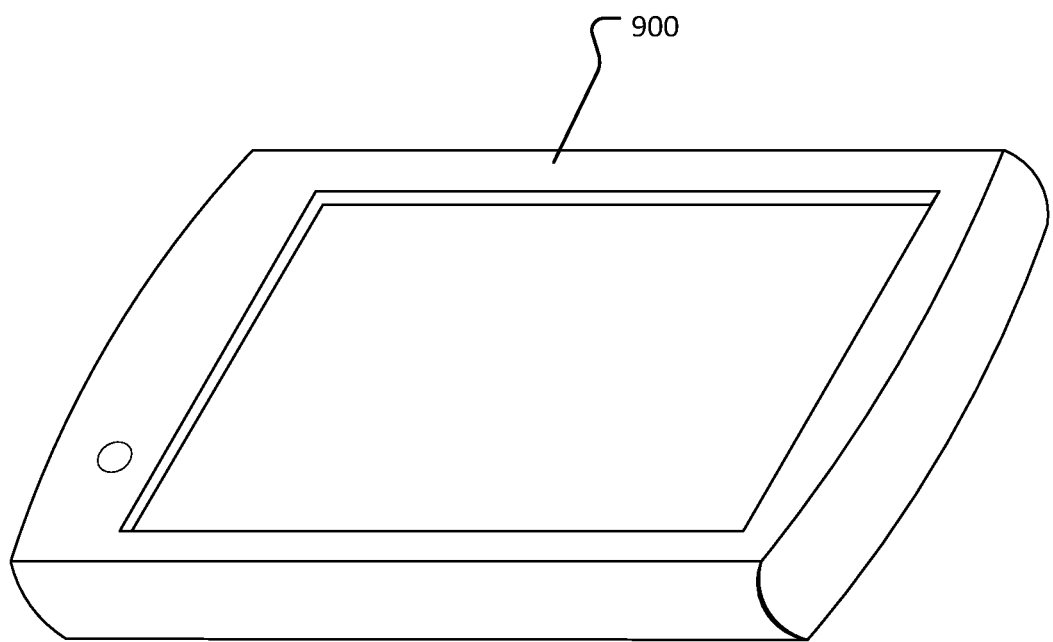
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving a user selection of a first structure for a three-dimensional (3D) environment; accessing a first asset container associated with the first structure, wherein the first asset container comprises a first set of assets; generating, using the first asset container and a common asset container, the 3D environment; receiving a user selection to change the first structure to a second structure; accessing a second asset container associated with the second structure that comprises a second set of assets different from the first set of assets; removing the first structure associated with the first set of assets from the generated 3D environment; generating the second structure using the second set of assets in the generated 3D environment; and generating an environment data file that comprises information about at least the common asset container and the second asset container. In an example, the set of operations further comprises receiving a user selection of content to include in the 3D environment, and the environment data file further comprises information about the selected content. In another example, removing the first structure associated with the first set of assets comprises identifying assets in the 3D environment associated with the first asset container. In a further example, the set of operations further comprises generating a placeholder indication that the second asset container associated with the second structure is loading. In yet another example, the placeholder indication is generated after removing the first structure associated with the first set of assets from the generated 3D environment. In a further still example, the set of operations further comprises storing the generated environment data file in an authored environment data store. In another example, each asset of the first set of assets is associated with an identifier of the first asset container, and removing the first structure comprises identifying assets of the first asset container in the 3D environment based on the identifier of the first asset container.

In another aspect, the technology relates to a method for processing a three-dimensional (3D) environment that comprises a first structure. The method comprises: accessing an environment data file for the 3D environment that comprises the first structure, wherein the first structure is associated with a first asset container comprises a first set of assets; receiving a user selection to change the first structure to a second structure; accessing a second asset container associated with the second structure that comprises a second set of assets different from the first set of assets; removing, based on an association with the first asset container, the first structure associated with the first set of assets from the 3D environment; generating the second structure using the second set of assets in the 3D environment; and generating an updated environment data file that comprises information about at least the second asset container. In an example, the accessed environment data file further comprises information about content to include in the 3D environment, and generating the updated environment data file further comprises including information relating to the content. In another example, the method further comprises generating a placeholder indication that the second asset container associated with the second structure is loading. In a further example, the placeholder indication is generated after removing the first structure associated with the first set of assets from the generated 3D environment. In yet another example, the method further comprises storing the updated environment data file in an authored environment data store. In a further still example, the accessed environment data file and the updated environment data file each further comprise information relating to a common asset container.

In another aspect, the technology relates to a method for generating a three-dimensional (3D) environment. The method comprises: receiving a user selection of a first structure for a 3D environment; accessing a first asset container associated with the first structure, wherein the first asset container comprises a first set of assets; generating, using the first asset container and a common asset container, the 3D environment; receiving a user selection to change the first structure to a second structure; accessing a second asset container associated with the second structure that comprises a second set of assets different from the first set of assets; removing the first structure associated with the first set of assets from the generated 3D environment; generating the second structure using the second set of assets in the generated 3D environment; and generating an environment data file that comprises information about at least the common asset container and the second asset container. In an example, the method further comprises receiving a user selection of content to include in the 3D environment, and the environment data file further comprises information about the selected content. In another example, removing the first structure associated with the first set of assets comprises identifying assets in the 3D environment associated with the first asset container. In a further example, the method further comprises removing the first structure associated with the first set of assets comprises identifying assets in the 3D environment associated with the first asset container. In yet another example, the placeholder indication is generated after removing the first structure associated with the first set of assets from the generated 3D environment. In a further still example, the method further comprises storing the generated environment data file in an authored environment data store. In an example, each asset of the first set of assets is associated with an identifier of the first asset container, and removing the first structure comprises identifying assets of the first asset container in the 3D environment based on the identifier of the first asset container.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        receiving, in association with authoring a three-dimensional (3D) environment, a first user selection of a first background for the 3D environment;
        accessing, based at least in part on the first user selection, a first asset container associated with the first background for the 3D environment, wherein the first asset container comprises a first set of assets;
        generating, using the first set of assets, the 3D environment;
        receiving one or more second user selections to add content to the first background for the 3D environment;
        adding the content to the 3D environment based at least in part on the one or more second user selections;
        receiving a third user selection to change the first background for the 3D environment to a second background for the 3D environment;
        accessing, based at least in part on the third user selection, a second asset container associated with the second background for the 3D environment, wherein the second asset container comprises a second set of assets that is different from the first set of assets;
        removing the first set of assets from the 3D environment; and
        generating, using the second set of assets, an updated 3D environment that retains the content previously added to the 3D environment based at least in part on the one or more second user selections.

2. The system of claim 1, wherein the set of operations further comprises generating a placeholder indication that the second asset container associated with the second background for the 3D environment is loading.

3. The system of claim 1, wherein the set of operations further comprises storing the updated 3D environment as a data file in an authored environment data store.

4. The system of claim 1, wherein each asset of the first set of assets is associated with an identifier of the first asset container, and wherein removing the first set of assets comprises identifying the first set of assets in the 3D environment based on the identifier of the first asset container.

5. A method for authoring a three-dimensional (3D) environment comprising:
    accessing an environment data file for the 3D environment that comprises a first background, wherein the first background is associated with a first asset container comprises a first set of assets;
    generating, using the first set of assets, the 3D environment;
    receiving one or more first user selections to add content to the first background;
    adding the content to the 3D environment based at least in part on the one or more first user selections;
    receiving a second user selection to change the first background to a second background;
    accessing, based at least in part on the second user selection, a second asset container associated with the second background that comprises a second set of assets different from the first set of assets;
    removing the first set of assets from the 3D environment; and
    generating, using the second set of assets, an updated 3D environment that retains the content previously added to the 3D environment based at least in part on the one or more first user selections.

6. The method of claim 5, further comprising generating a placeholder indication that the second background is loading.

7. The method of claim 6, wherein the placeholder indication is generated after removing the first set of assets from the 3D environment.

8. The method of claim 5, further comprising storing the updated 3D environment as an updated environment data file in an authored environment data store.

9. The method of claim 5, wherein the environment data file and the updated environment data file each further comprise information relating to a common asset container.

10. A method for generating a three-dimensional (3D) environment, comprising:
    receiving, in association with authoring the 3D environment, a first user selection of a first background for the 3D environment;
    accessing, based at least in part on the first user selection, a first asset container associated with the first background for the 3D environment, wherein the first asset container comprises a first set of assets;
    generating, using the first set of assets, the 3D environment;

receiving one or more second user selections to add content to the first background for the 3D environment;

adding the content to the 3D environment based at least in part on the one or more second user selections;

receiving a third user selection to change the first background for the 3D environment to a second background for the 3D environment;

accessing, based at least in part on the third user selection, a second asset container associated with the second background for the 3D environment, wherein the second asset container comprises a second set of assets different from the first set of assets;

removing the first set of assets from the 3D environment; and generating, using the second set of assets, an updated 3D environment that retains the content previously added to the 3D environment based at least in part on the one or more second user selections.

11. The method of claim 10, further comprising generating a placeholder indication that the second background is loading.

12. The method of claim 11, wherein the placeholder indication is generated after removing the first set of assets from the 3D environment.

13. The method of claim 10, further comprising storing the updated 3D environment as a data file in an authored environment data store.

14. The method of claim 10, wherein each asset of the first set of assets is associated with an identifier of the first asset container, and wherein removing the first set of assets comprises identifying the first set of assets in the 3D environment based on the identifier of the first asset container.

* * * * *